Patented June 10, 1952

2,599,745

UNITED STATES PATENT OFFICE 2,599,745

COMPOSITION FOR SEALING POROUS FORMATIONS IN OIL AND GAS WELLS

John G. Campbell, Corpus Christi, and Homer L. Twining, San Antonio, Tex.; said Campbell assignor to said Twining No Drawing. Application June 23, 1949, Serial No. 100,972

5 Claims. (Cl. 252—8.5)

The invention relates to the art of drilling wells and has reference in particular to an improved and satisfactory fluid mixture for preventing the partial or complete loss of circulation during rotary drilling operations or the loss of the drilling fluid when drilling with cable tools.

In the drilling of a well, for example, to obtain petroleum oil, a fluid or mud is employed which may comprise a mixture of water, gel-forming material such as clay, bentonite and the like, weighting materials and special additives for plugging or sealing the walls of the well bore to prevent loss of the fluid to the surrounding formations. The primary function of the drilling fluid is to lubricate and cool the drilling tool and to suspend the cuttings from the drilling operation so that they are carried to the surface either by bailing the well bore as in cable tool drilling or by circulation of the fluid in rotary drilling. In said rotary drilling operations the fluid flows through the drilling pipe into the well bore under pressure and returns to the surface in the space between the pipe and side walls of the bore, and accordingly other important functions of the drilling fluid are to keep down formation pressures by the weight of the fluid and to seal the walls of the bore to prevent or minimize loss of the drilling fluid to the formations being penetrated.

The problem of lost circulation is one of the most difficult of the many problems encountered in oil well drilling by the rotary method. As the drilling fluid is circulated in the bore hole under a pressure exceeding that of the formation, the solid particles suspended in the fluid and also the colloidal ingredients of the fluid flow into the formation through the interstices, passages and pores of the formation material. Loss of circulation, however, is not encountered unless the size of the interstices or pores increase to a point where the clay particles can not form a bridge. The critical value of this pore diameter very likely varies with different drilling muds and even with the same mud, considering the fact that during the drilling process a portion of the clay formation penetrated usually becomes a part of the fluid, thereby altering its characteristics. If the pore diameter of a zone exceeds this critical value then loss of fluid occurs until a suspended solid particle plugs or reduces the pore size below the critical diameter, permitting the clay particles to function in forming the impermeable sheath.

In Patent No. 2,209,591 and in other patents relating to drilling fluids the following materials are described as effective additives for improving the formation sealing properties of ordinary drilling muds: glue, casein, milk powder, blood albumin, gelatin, gum arabic, copal seaweed, agar agar, cottonseed hulls, linseed cake, wheat flour, corn starch, quebracho, psyllium seed, dextrose, montan wax, mica and asbestos fibers. However, when highly permeable zones such as gravel pits and crevices are penetrated such materials fail to bridge since as in the case of clay particles they are too small and they lack the necessary qualities to effect a blocking or stoppage of the flow. Of course, there are factors limiting the size of the particles of the solid additives, since as ingredients of the drilling fluid they must be able to pass through the pump and they must not clog or otherwise interfere with pumping operations.

Accordingly, an object of the invention is to provide materials for use as additives to drilling fluids which will have such coaction in combination with each other as to effectively seal porous formations by the building of a strong but thin impervious sheath.

Another object of the invention is to provide ingredients for drilling fluid which will meet the requirements of an all-purpose additive to prevent loss of the fluid to surrounding formations.

Another object of the invention is to provide drilling fluid additives for sealing the well bore and which will not interfere with the pumping of the drilling fluid, which will not deteriorate substantially during the drilling operation, and which will not readily separate out of the drilling fluid.

Another object is to prevent lost circulation by adding to the drilling fluid materials such as wool shoddy or cotton linters to form a fibrous base and a filler such as sawdust having a wide range of particle size for coaction with the fibrous base.

Considerable research and testing has been done in connection with the development of the present invention and during the period many types and combinations of fibers were tested in admixture with a filler type material. It was found that the interstices between the gravel particles are first bridged by the fibers and then by the filler additive and that the mat produced remains effective until the exerted pressure exceeds the rupture strength of the fibers. Hence, the first consideration was to select a fiber or fibers having adequate strength with the required flexibility. Whereas, the strength of the fibers determines the limiting pressure applicable to any admixture, a measure of the flexibility or pliability of a fibrous substance is indicated by the filter cake thickness. This is due to the fact that the flexible fibers conform to the cavities in the formations, thereby plugging them and stopping further flow of mud. At least fibers that are flexible tend to conform, whereas stiff and inflexible fibers do not. Thus animal, vegetable or synthetic fiber will accomplish ths purpose of the present invention provided it has the required flexibility, fineness and textile strength. Length of the fiber is however important due to mechanical injections by means of pumps into the well bore and accordingly fibers longer than 4 inches are objectionable and fibers shorter than ¼ inch fail to bridge except in sands of very small pores.

Materials found satisfactory in producing a strong but flexible fibrous base include wool shoddy, cotton linters, flax, mohair, rabbit fur, nylon and rayon. We prefer wool shoddy and cotton linters because these materials are cheap and generally available. For the filler component mentioned can be made of sawdust, ground corn cobs, and rice hulls. Such materials are relatively indestructible in the fluid and as regards the sawdust and ground corn cobs they can be secured in particle sizes covering a wide range.

Wool shoddy may consist of a mixture of wool fibers and jute fibers. At least this is true of ¼ inch shoddy as purchased on the market at the present time. An analysis of 1 inch shoddy, known to be almost pure wool, indicated the nitrogen content of the same to be approximately 8.97 per cent, whereas, the one-quarter inch shoddy had a nitrogen content of approximately 4.35 per cent. Jute fibers do not contain more than a trace of nitrogen. Cotton linters are generally defined as the residual fibers removed from cottonseed by mechanical processes and said linters have been classified as "mill run," "first cut" and "second cut." Any of these fibers will serve the purpose of the invention, provided they fulfill the main basic requirements for the fibrous material as herein noted. Staple cotton can also be used but as in the case with regular wool, nylon and also rayon, the cost is the controlling factor.

Since porous formations are usually of varying size a filler type plugging agent suitable for all formations should be one of variable size and accordingly the sawdust and ground corn cobs when used as a filler should comprise assorted size particles varying from 0.006 to 0.187 inch in diameter. Filler particles of smaller diameter than 0.006 is not necessary since the clay particles function for this range. Rice hulls will generally be used in combination with the sawdust or ground corn cobs.

Referring more particularly to the filling material, considered as suitable for the present invention, the particle size distribution of the same is given in the following table:

| | Per cent |
|---|---|
| Retained on No. 4 screen | 0.0 |
| Passing No. 4 but retained on No. 8 | 5.0 |
| Passing No. 8 but retained on No. 16 | 10.0 |
| Passing No. 16 but retained on No. 30 | 40.0 |
| Passing No. 30 but retained on No. 50 | 30.0 |
| Passing No. 50 | 15.0 |

The above table represents a preferred grading of the various size filler particles for an all-purpose additive, and the same is not intended to be restrictive or limiting, since the actual percentage for each screen size is not so critical as the mere presence of a substantial amount of each particle size. The number of openings per square inch determines the screen number. For example, a No. 4 screen contains four openings within the inch, and each opening is one-fourth inch square less the diameter of the wire used. A No. 8 screen contains eight openings within the inch providing openings which are one-eighth inch square, etc.

The effectiveness of the present ingredients as sealing compounds has been adequately proven by actual tests and also by laboratory tests using specially designed equipment to simulate subsurface lost circulation conditions and wherein the present ingredients were combined with other materials, and were combined with sawdust particles of different size in order to determine the relationship between average pore size and average particle size for the best results. Two measurements were recorded, the maximum pressure required to force the mud through a gravel bed and the thickness of the retaining mat on the latter. Obviously, the effectiveness of a plugging agent is denoted not only by the pressure required to rupture the fibers but by the thickness of the mat formed. The other materials included shredded cellophane, shredded bagasse, coarse flake mica, shredded redwood bark, balsam wood wool and mineral wool.

The addition of wool shoddy or cotton linters and sawdust to fluid admixtures including one or more of the said other materials had the effect of materially increasing the pressure before failure occurred and these additives also produced the minimum filter cake thickness. In some tests on a certain character of gravel bed the use of wool shoddy and sawdust produced the best results and in other tests on different gravel beds cotton linters and sawdust proved superior. An all-fiber composition was also tested and the same produced highly satisfactory results and substantiated the statements made herein relating to the strength of the fibrous mat. In this test cotton, wool and lechuguilla fibers were employed. The latter is one of the vegetable fibers contemplated by the invention and is obtained from the lechuguilla cactus from which sisal rope is manufactured.

The particular effectivness of the filler is somewhat related to the average pore size of the permeable formation. In cavernous type formations long fibers are required such as the one inch wool shoddy because of the larger size pores encountered, and for similar reasons it is desired to use graded sawdust or ground corn cobs having a high percentage of larger size particles. For general use the shorter length fibers are preferred as a more economical and better product is produced from the standpoint of mixing and pumping at the well. Also as the average size of the pores decreases the sawdust can be graded in like manner with a decrease in the larger sawdust particles in favor of the intermediate sizes. Of course it is not necessary to use fibers of the same length and the invention additionally contemplates a fluid admixture wherein the fibers are graded from approximately ¼ inch in length to 1 inch in length or thereabouts and with a filler also of graded particle size. The proportions of the fibrous material to be compounded with the filler are not critical and a wide range of different combinations can be produced each one having more or less special application to a particular type formation. As a general rule the fibrous material and filler can be mixed in equal quantities. However, we have obtained satisfactory results in plugging a limestone formation with a composition containing equal parts by weight of sawdust, rice hulls and one fourth inch wool shoddy. With the rice hulls eliminated the drilling fluid composition of the invention may consist of equal parts by weight of sawdust and wool shoddy.

An important feature of the invention resides in the coaction of the sawdust particles with the fibrous mat produced by the fibers in bridging the pores or voids in the loose formations. The penetration of the plugging materials into the pores is entirely adequate for retention purposes and the impervious sheath which is quickly formed is characterized by maximum strength with minimum thickness.

What is claimed is:

1. A composition for sealing permeable formations encountered in the drilling of a well, comprising fibrous material and a filler in admixture therewith, said fibrous material comprising strong, flexible fibers selected from the group consisting of jute, flax, mohair, lechuguilla fibers, synthetic fibers, cotton, cotton linters, wool and wool shoddy, said fibrous material being present in proportions by weight from approximately 33% to 90% and including fibers of different lengths ranging from approximately one-fourth to four inches, and said filler being present in amounts up to 67% and comprising sawdust particles ranging in size but not smaller than .006 inch in diameter.

2. A composition for sealing permeable formations encountered in the drilling of a well, comprising fibrous material and a granular filler in admixture therewith, said fibrous material comprising strong, flexible fibers selected from the group consisting of jute, flax, mohair, lechuguilla fibers, synthetic fibers, cotton, cotton linters, wool and wool shoddy, said fibrous material being present in proportions by weight from approximately 33% to 90% and including fibers of different lengths ranging from approximately one-fourth to four inches, and said granular filler being present in amounts up to 67% and comprising sawdust graded as to particle size so that not less than 5% nor more than 40% will be retained on any screen of the following U. S. series 8, 16, 30 and 50 and wherein all of the granular filler will pass a No. 4 screen.

3. A composition for sealing permeable formations encountered in the drilling of a well, comprising fibrous material and a granular filler in admixture therewith, said fibrous material comprising strong, flexible fibers selected from the group consisting of jute, flax, mohair, lechuguilla fibers, synthetic fibers, cotton, cotton linters, wool and wool shoddy, said fibrous material being present in proportions by weight from approximately 33% to 90% and including fibers of different lengths ranging from approximately one-fourth to four inches, and said granular filler consisting of particles ranging in size but not substantially smaller than .006 inch in diameter, said filler being present in amounts up to 67% and being selected from the group consisting of ground corn cobs and sawdust.

4. A composition for sealing permeable formations encountered in the drilling of a well comprising fibrous material and a granular filler in admixture therewith, said fibrous material comprising strong, flexible fibers selected from the group consisting of jute, flax, mohair, lechuguilla fibers, synthetic fibers, cotton, cotton linters, wool and wool shoddy, said fibrous material being present in proportions by weight from approximately 33% to 90% and including fibers of different lengths ranging from approximately one-fourth to four inches, said filler being selected from the group consisting of ground corn cobs and sawdust, said filler being present in amounts approximately 67% and being graded as to particle size substantially as follows:

| | Per cent |
|---|---|
| Retained on No. 4 screen | 0.0 |
| Passing No. 4 but retained on No. 8 | 5.0 |
| Passing No. 8 but retained on No. 16 | 10.0 |
| Passing No. 16 but retained on No. 30 | 40.0 |
| Passing No. 30 but retained on No. 50 | 30.0 |
| Passing No. 50 | 15.0 |

5. In the drilling of a well, the method of preventing loss of the drilling fluid to porous formations, which consists in incorporating in the drilling fluid a sealing composition consisting of a mixture of fibrous material and a granular filler, said fibrous material comprising strong, flexible fibers selected from the group consisting of jute, flax, mohair, lechuguilla fibers, synthetic fibers, cotton, cotton linters, wool and wool shoddy, said fibrous material being present in the mixture in proportions by weight from approximately 33% to 90% and including fibers of different lengths, said granular filler being present in the mixture in amounts up to 67% and being selected from the group consisting of ground corn cobs and sawdust with particles thereof graded as to size so that not less than about 5% nor more than 40% will be retained on any screen of the following U. S. series 8, 16, 30 and 50, with all of the granular filler passing a No. 4 screen, and pumping the drilling fluid with the sealing composition admixed therewith into the well bore, whereby to seal the porous formations to prevent the loss of drilling fluid therethrough by the interweaving action of the fibers which produce a mat and by the action of the filler therewith which forms an impervious sheath in the formations.

JOHN G. CAMPBELL.
HOMER L. TWINING.

REFERENCES CITED

The following references are of record in the file of this patent:

UNITED STATES PATENTS

| Number | Name | Date |
|---|---|---|
| 1,807,082 | Boynton | May 26, 1931 |
| 2,041,086 | O'Brien | May 19, 1936 |
| 2,064,936 | McQuiston | Dec. 22, 1936 |
| 2,119,829 | Parsons | June 7, 1938 |
| 2,214,366 | Freeland et al. | Sept. 10, 1940 |
| 2,398,347 | Anderson | Apr. 16, 1946 |

OTHER REFERENCES

Sawdon, Lost Circulation in Rotary Holes, article in the Petroleum Engineer, Feb. 1936, pgs. 27 to 30.

Langton, Fibrous Materials Aid Restoring Lost Drilling Well Circulation, article in The Oil and Gas Journal, Apr. 23, 1936, pgs. 31, 33 and 34.